United States Patent
Park

(10) Patent No.: US 10,990,378 B2
(45) Date of Patent: Apr. 27, 2021

(54) STORAGE DEVICE AND OPERATING METHOD THEREOF

(71) Applicant: SK hynix Inc., Gyeonggi-do (KR)

(72) Inventor: Sung-Jin Park, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/537,034

(22) Filed: Aug. 9, 2019

(65) Prior Publication Data

US 2020/0201617 A1    Jun. 25, 2020

(30) Foreign Application Priority Data

Dec. 20, 2018 (KR) .......................... 10-2018-0165840

(51) Int. Cl.
*G06F 8/65* (2018.01)
*G06F 3/06* (2006.01)
*G06F 11/14* (2006.01)

(52) U.S. Cl.
CPC ............. *G06F 8/65* (2013.01); *G06F 3/064* (2013.01); *G06F 3/0614* (2013.01); *G06F 3/0673* (2013.01); *G06F 11/1433* (2013.01); *G06F 11/1458* (2013.01)

(58) Field of Classification Search
None
See application file for complete search history.

(56) References Cited

U.S. PATENT DOCUMENTS

| | | | | |
|---|---|---|---|---|
| 6,789,157 B1 * | 9/2004 | Lilja | ........................ | G06F 8/65 711/102 |
| 2008/0266948 A1 * | 10/2008 | Jang | ........................ | G11C 29/52 365/185.03 |
| 2011/0179195 A1 * | 7/2011 | O'Mullan | ................. | G06F 8/65 710/16 |
| 2012/0110378 A1 * | 5/2012 | Fan | ..................... | G06F 11/1658 714/15 |
| 2016/0112342 A1 * | 4/2016 | Doi | ........................ | H04L 47/78 709/226 |
| 2017/0220404 A1 * | 8/2017 | Polar Seminario | ........................ | G06F 11/0736 |
| 2018/0089435 A1 * | 3/2018 | Zander | ................. | G06F 21/577 |
| 2018/0121656 A1 * | 5/2018 | Scherer, III | ......... | G06F 11/1469 |
| 2020/0143057 A1 * | 5/2020 | Limonciello | ......... | G06F 21/572 |

FOREIGN PATENT DOCUMENTS

| | | |
|---|---|---|
| KR | 10-2012-0050062 | 5/2012 |
| KR | 10-1461319 | 11/2014 |

* cited by examiner

*Primary Examiner* — Philip Wang

(74) *Attorney, Agent, or Firm* — IP & T Group LLP

(57) ABSTRACT

A storage device includes a semiconductor memory device including a plurality of memory blocks; and a controller configured to control the semiconductor memory device, wherein the semiconductor memory device stores original firmware as default firmware and one or more copies of the original firmware as pieces of backup firmware in a first memory block among the plurality of memory blocks, and wherein the controller includes a firmware load circuit configured to load the default firmware when the default firmware is valid and load one of the pieces of backup firmware when the default firmware is not valid; and a firmware update circuit configured to update the default firmware from a previously updated version of the original firmware to a currently updated version of the original firmware.

19 Claims, 14 Drawing Sheets

STORAGE DEVICE AND OPERATING METHOD THEREOF

CROSS-REFERENCE TO RELATED APPLICATION

The present application claims priority to Korean Patent Application No. 10-2018-0165840, filed in the Korean Intellectual Property Office on Dec. 20, 2018, which is incorporated herein by reference in its entirety.

BACKGROUND

1. Technical Field

Various embodiments generally relate to a storage device and an operating method thereof.

2. Related Art

A storage device stores data based on a request of a host such as a computer and a smartphone. A storage device may be any of various types including a device which stores data in a magnetic disk, such as a hard disk drive (HDD), and a device which stores data in a nonvolatile memory, such as a solid state drive (SDD), a UFS (universal flash storage) device or an eMMC (embedded MMC) device.

A storage device may include a SoC (system-on-chip) and a firmware (FW) mounted therein as a hardware, to perform read and write operations for the nonvolatile memory according to a request of the host. Firmware may be stored as software in a memory in the storage device, and the storage device loads the firmware at the time of booting. The firmware may be updated by a request of the host or an external device.

SUMMARY

Various embodiments are directed to a storage device which operates normally even in the case where an error has occurred in a certain firmware stored in the storage device, and an operating method thereof.

In an embodiment, a storage device may include: a semiconductor memory device including a plurality of memory blocks; and a controller configured to control the semiconductor memory device, wherein the semiconductor memory device stores original firmware as a default firmware and one or more copies of the original firmware as pieces of backup firmware in a first memory block among the plurality of memory blocks, and wherein the controller includes a firmware load circuit configured to load the default firmware when the default firmware is valid and load one of the pieces of backup firmware when the default firmware is not valid; and a firmware update circuit configured to update the default firmware from a previously updated version of the original firmware to a currently updated version of the original firmware.

In an embodiment, a method for operating a storage device including a semiconductor memory device which includes a plurality of memory blocks and a controller which controls the semiconductor memory device may include: storing original firmware as default firmware and one or more copies of the original firmware as pieces of backup firmware in a first memory block in the semiconductor memory device; loading the default firmware or one of the pieces of backup firmware; and updating the default firmware from a previously updated version of the original firmware to a currently updated version of the original firmware, wherein the loading of the default firmware or one of the pieces of backup firmware includes loading the default firmware when the default firmware is valid and loading the pieces of backup firmware when the default firmware is not valid.

In accordance with the embodiments of the disclosure, a storage device which operates normally even in the case where an error has occurred in a certain firmware stored in the storage device and an operating method thereof are provided.

DETAILED DESCRIPTION

Figure 1:
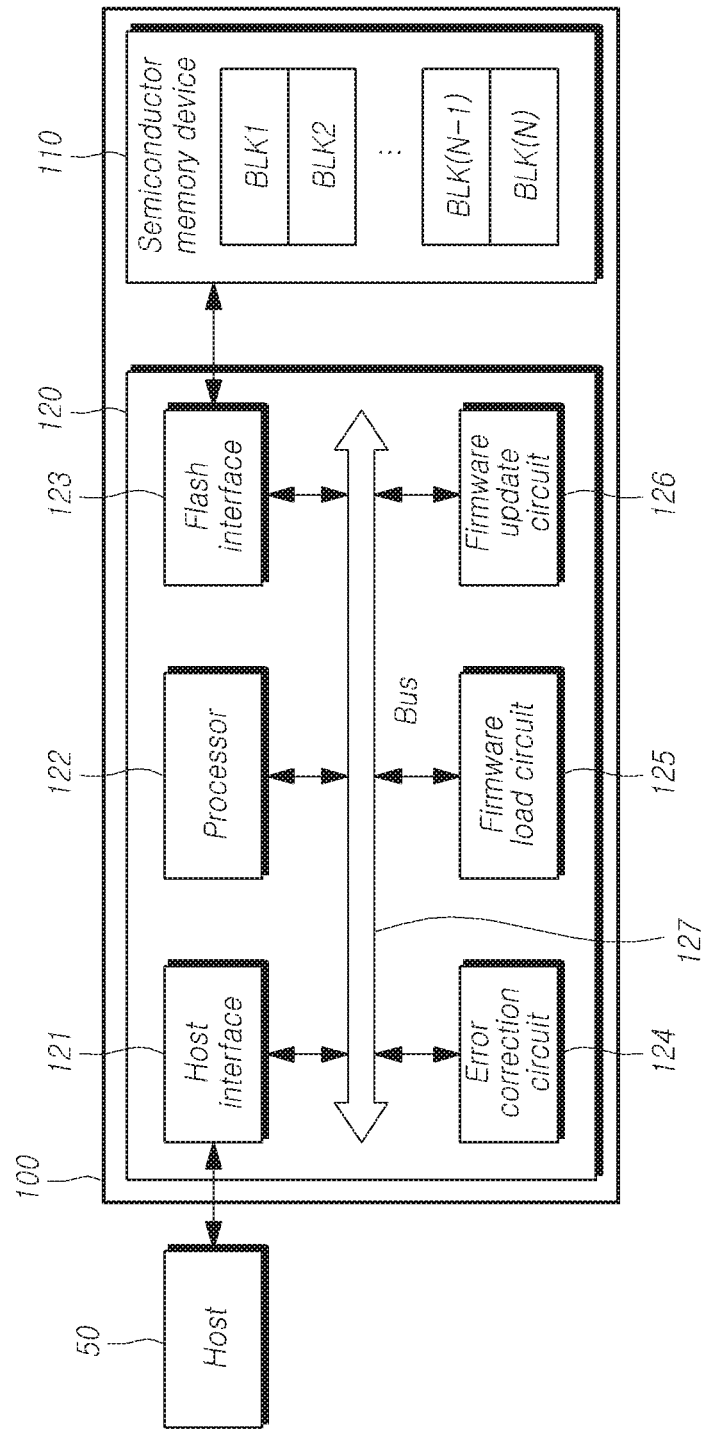
FIG. 1 is a diagram illustrating a configuration of a storage device in accordance with an embodiment of the disclosure.

In the disclosure, advantages, features and methods for achieving them will become more apparent after a reading of the following embodiments taken in conjunction with the accompanying drawings. The invention, however, may be embodied in different forms and thus should not be construed as being limited to the embodiments set forth herein. Rather, these embodiments are provided to describe the disclosure in detail to the extent that a person skilled in the art to which the disclosure pertains can practice the invention.

It is to be understood that the invention is not limited to the particulars shown in the drawings, and that the drawings are not necessarily to scale and in some instances proportions may have been exaggerated in order to more clearly depict certain features of the disclosure. Like reference numerals denote like elements throughout the drawings and the description.

While particular terminology is used herein, it is to be appreciated that such terminology is for the purpose of describing particular embodiments only; such terminology is not intended to limit the scope of the invention.

Specific structural and functional description is provided to describe embodiments of the disclosure. However, as noted above, embodiments of the disclosure may be implemented in various forms and thus the invention is not limited to either specific details or the embodiments described herein. As such, the present invention encompasses all variations, modifications and equivalents of the disclosed embodiments to the extent they fall within the scope of the claims.

As used herein, the term "and/or" includes any and all combinations of one or more of the associated listed items. The terms such as "first" and "second" may be used to identify various components, but those components should not be limited by the terms. The terms are merely used to distinguish one component from other component(s) that have the same or similar names. For example, a first component in one instance may be designated as a second component in another instance without departing from the scope based on the concept of the disclosure.

It will be understood that, when an element is referred to as being "connected" or "coupled" to another element, it can be directly connected or coupled to the other element or one or more intervening elements may be present. In contrast, when an element is referred to as being "directly connected" or "directly coupled" to another element, there are no intervening elements present. Other representations describing relationships among components, that is, "between" and "directly between" or "adjacent to," and "directly adjacent to," should be interpreted in similar manners.

A singular expression includes a plural expression and vice versa, unless the context indicates otherwise. In the present specification, it should be understood that terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof are present or will be added.

Unless differently defined, all terms used herein, including technical or scientific terms, have the same meanings as the terms generally understood by those skilled in the art to which the disclosure pertains. Ordinary dictionary-defined terms should be interpreted in the context of the related art, and not be interpreted in an ideal or excessively formal way, unless they are clearly so defined in the present specification.

Detailed description of well-known functions and structures incorporated herein may be omitted to avoid obscuring the subject matter of the disclosure. This aims to make the subject matter of the disclosure clearer.

Also, in describing the components of the disclosure, there may be terms used like first, second, A, B, (a), and (b). These are solely for the purpose of differentiating one component from the other, not to imply or suggest the substances, order or sequence of the components. If a component is described as "connected," "coupled" or "linked" to another component, it may mean that the component is not only directly "connected," "coupled" or "linked" but also is indirectly "connected," "coupled" or "linked" via a third component.

Various embodiments are described below in detail with reference to the accompanying drawings to explain the disclosure in detail to the extent that a person skilled in the art can easily carry out the technical idea of the disclosure. Throughout the specification, reference to "an embodiment" or the like is not necessarily to only one embodiment, and different references to any such phrase are not necessarily to the same embodiment(s).

FIG. 1 is a diagram illustrating a configuration of a storage device in accordance with an embodiment of the disclosure.

Referring to FIG. 1, a storage device 100 may include a semiconductor memory device 110 and a controller 120.

The semiconductor memory device 110 may store data. The semiconductor memory device 110 operates in response to the control of the controller 120. The semiconductor memory device 110 may include a memory cell array including a plurality of memory cells which store data. The detailed structure of the semiconductor memory device 110 is described below with reference to FIG. 2.

In an embodiment, the semiconductor memory device 110 may be a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM) or a spin transfer torque random access memory (STT-RAM).

In an embodiment, the semiconductor memory device 110 may be realized as a three-dimensional array structure. The disclosure may be applied to not only a flash memory device in which a charge storage layer is configured by a conductive floating gate (FG) but also a charge trap flash (CTF) in which a charge storage layer is configured by a dielectric layer.

The semiconductor memory device 110 is configured to receive a command and an address from the controller 120 and access a region selected by the address in the memory cell array. In other words, the semiconductor memory device 110 may perform an operation corresponding to the command, for a region selected by the address.

For example, the semiconductor memory device 110 may perform a program operation, a read operation and an erase operation. In the program operation, the semiconductor memory device 110 may program data to a region selected by the address. In the read operation, the semiconductor memory device 110 may read data from a region selected by the address. In the erase operation, the semiconductor memory device 110 may erase data stored in a region selected by the address.

The semiconductor memory device 110 may include therein a plurality of, e.g., N, memory blocks (N is a natural number), which may be designated as BLK1, BLK2, . . . , BLK(N), respectively. The semiconductor memory device 110 may store firmware in at least one memory block among the plurality of memory blocks BLK1, BLK2, . . . , BLK(N).

When a memory block of the semiconductor memory device 110 in which a firmware is stored is referred to as a first memory block, default firmware and at least one piece of backup firmware may be stored in the first memory block.

The default firmware means firmware which is loaded first upon booting. Original firmware and its most recently updated version may be designated as the default firmware. Each piece of backup firmware may be loaded instead of the default firmware when the default firmware is determined as invalid. One or more copies of the original firmware and previously updated versions of the original firmware may be designated as the respective pieces of backup firmware. Loading firmware means preparing for the firmware to be executed by copying all or a part of the firmware stored in the semiconductor memory device 10 to a memory (e.g., an SRAM or a DRAM).

Because the size of data which can be stored in one memory block is larger than the size of one piece of firmware, at least one piece of the firmware may be stored in one memory block. Therefore, default firmware and at least one piece of backup firmware may be stored in one memory block instead of being stored in different memory blocks. In this case, when accessing backup firmware as a result of an error having occurred in default firmware, there is no need to attempt to access a separate memory block, which may reduce overhead.

The controller 120 may control the operation of the semiconductor memory device 110 according to a request of a host 50 or regardless of a request of the host 50. For example, the controller 120 may control write, read, erase and background operations for the semiconductor memory device 110. For example, the background operation may be a garbage collection (GC) operation, a wear leveling (WL) operation, a bad block management (BBM) operation, or the like.

The controller 120 may include a host interface 121, a processor 122, a flash interface 123, an error correction circuit 124, a firmware load circuit 125, a firmware update circuit 126 and a bus 127.

The host interface 121 provides an interface for communication with the host 50.

The flash interface 123 provides an interface for communication with the semiconductor memory device 110.

The error correction circuit 124 may perform error correction for data to be stored in the semiconductor memory device 110. The error correction circuit 124 may verify an error for the pieces of firmware stored in the semiconductor memory device 110.

The firmware load circuit 125 loads the default firmware or one piece of the backup firmware which are stored in the semiconductor memory device 110. In detail, the firmware load circuit 125 first determines whether the default firmware stored in the first memory block in the semiconductor memory device 110 is valid. If the default firmware is valid, the firmware load circuit 125 loads the default firmware. If the default firmware is not valid, the firmware load circuit 125 loads one of the pieces of backup firmware stored in the first memory block. The firmware load circuit 125 may be realized by a ROM device which is initially executed upon booting.

The firmware update circuit 126 may update the original firmware stored in the first memory block in the semiconductor memory device 110, with an updated version of the original firmware. The original firmware and its most recently updated version may be designated as the default firmware and previous versions and copies of the original firmware may be designated as pieces of backup firmware. The most recently updated version of the original firmware may operate as the default firmware after a firmware update.

The updated versions of the original firmware are different versions thereof and a copy of the original firmware is the same as the original firmware.

The firmware update circuit 126 may download an updated version of the original firmware by various methods. For instance, the firmware update circuit 126 may download an updated version of the original firmware from the host 50 or may download an updated version of the original firmware which is stored in a specific region in the semiconductor memory device 110 by an external device (e.g., a jig).

The bus 127 may be configured to provide channels among the components of the controller 120.

The processor 122 may control general operations of the controller 120, and may perform a logic calculation. The processor 122 may communicate with the host 50 through the host interface 121, and may communicate with the semiconductor memory device 110 through the flash interface 123. The processor 122 may detect an error of data stored in the semiconductor memory device 110 and may correct the error, if necessary, through the error correction circuit 124.

The processor 122 may perform the function of a flash translation layer (FTL). The processor 122 may convert a logical block address (LBA) provided by the host 50, into a physical block address (PBA), through the flash translation layer FTL. The flash translation layer (FTL) may receive the logical block address (LBA) and convert it into the physical block address (PBA), by using a mapping table. There are various address mapping methods of the flash translation layer, depending on a mapping unit. Representative address mapping methods include a page mapping method, a block mapping method and a hybrid mapping method.

The processor 122 is configured to randomize data received from the host 50. For example, the processor 122 may randomize the data received from the host 50, by using a randomizing seed. Randomized data as data to be stored is provided to the semiconductor memory device 110 and is programmed in the memory cell array.

The processor 122 is configured to derandomize data received from the semiconductor memory device 110, in a read operation. For example, the processor 122 may derandomize data received from the semiconductor memory device 110, by using a derandomizing seed. Derandomized data may be outputted to the host 50.

The processor 122 may control general operations of the controller 120, and may execute the default firmware or backup firmware loaded by the firmware load circuit 125 to perform a logic calculation.

Figure 2:
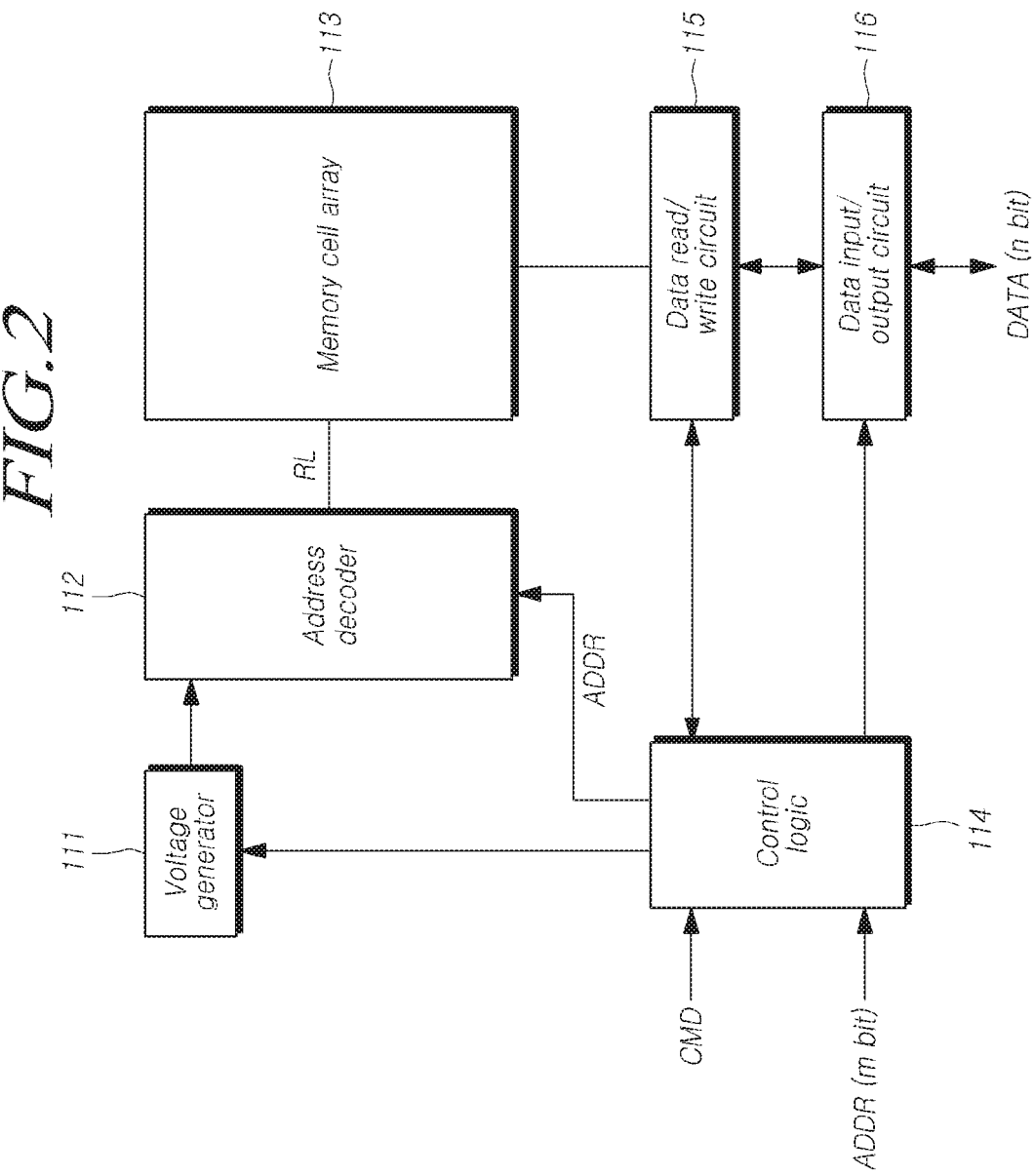
FIG. 2 is a diagram illustrating a structure of a semiconductor memory device, such as that of FIG. 1.

FIG. 2 is a diagram of a structure of the semiconductor memory device 110 of FIG. 1.

Referring to FIG. 2, the semiconductor memory device 110 may include a voltage generator 111, an address decoder 112, a memory cell array 113, control logic 114, a data read/write circuit 115 and a data input/output circuit 116.

The memory cell array 113 includes a plurality of memory blocks that are coupled to the address decoder 112 through row lines RL. The plurality of memory blocks are coupled to the data read/write circuit 115 through bit lines BL[1:m].

As described above with reference to FIG. 1, the semiconductor memory device 110 may store pieces of the firmware in at least one memory block among the plurality of memory blocks. When a memory block of the semiconductor memory device 110 in which the pieces of the firmware is stored is referred to as a first memory block, the default firmware and at least one piece of backup firmware may be stored in the first memory block.

Each of the plurality of memory blocks includes a plurality of memory cells. Among the plurality of memory cells, memory cells which are coupled to the same word line are defined as one page. That is to say, the memory cell array 113 may be configured by a plurality of pages.

In an embodiment, each of the plurality of memory blocks included in the memory cell array 113 may include a plurality of dummy cells. At least one of the dummy cells may be coupled in series between a drain select transistor and memory cells and between a source select transistor and memory cells.

Each of the memory cells included in the memory cell array 113 may be configured by a single level cell (SLC) storing one data bit, a multi-level cell (MLC) storing two data bits, a triple level cell (TLC) storing three data bits or a quad level cell (QLC) storing four data bits.

The address decoder 112 is coupled to the memory cell array 113 through the row lines RL. The row lines RL may include drain select lines, word lines, source select lines and a common source line. In an embodiment, the word lines may include normal word lines and dummy word lines. In an embodiment, the row lines RL may further include a pipe select line.

The address decoder 112 is configured to operate in response to the control of the control logic 114. The address decoder 112 receives an address ADDR from the control logic 114.

The address decoder 112 is configured to decode a block address in the received address ADDR. The address decoder 112 selects at least one memory block among the memory blocks depending on the decoded block address. The address decoder 112 is configured to decode a row address in the received address ADDR. The address decoder 112 may apply voltages provided from the voltage generator 111, to at least one word line WL, depending on the decoded row address, and thereby, may select at least one word line in the selected memory block.

In a program operation, the address decoder 112 may apply a program voltage to a selected word line and may apply a pass voltage of a level lower than the program voltage to unselected word lines. In a program verify operation, the address decoder 112 may apply a verify voltage to the selected word line and may apply a verify pass voltage higher than the verify voltage to the unselected word lines.

In a read operation, the address decoder 112 may apply a read voltage to a selected word line and may apply a pass voltage higher than the read voltage to unselected word lines.

In an embodiment, an erase operation of the semiconductor memory device 110 is performed on a memory block basis. The address ADDR inputted to the semiconductor memory device 110 in the erase operation includes a block address. The address decoder 112 may decode the block address, and may select one memory block depending on the decoded block address. In the erase operation, the address decoder 112 may apply a ground voltage to word lines which are coupled to a selected memory block.

In an embodiment, the address decoder 112 may be configured to decode a column address in the received address ADDR. The decoded column address (DCA) may be transferred to the data read/write circuit 115. For instance, the address decoder 112 may include components such as a row decoder, a column decoder and an address buffer.

The voltage generator 111 is configured to generate a plurality of voltages by using an external power supply voltage supplied to the semiconductor memory device 110. The voltage generator 111 operates in response to the control of the control logic 114.

As an embodiment, the voltage generator 111 may generate an internal power supply voltage by regulating the external power supply voltage. The internal power supply voltage generated in the voltage generator 111 is used as an operating voltage of the semiconductor memory device 110.

In an embodiment, the voltage generator 111 may generate a plurality of voltages by using the external power supply voltage or the internal power supply voltage. The voltage generator 111 may be configured to generate various voltages required in the semiconductor memory device 110. For example, the voltage generator 111 may generate a plurality of program voltages, a plurality of pass voltages, a plurality of selected read voltages and a plurality of unselected read voltages.

For example, the voltage generator 111 may include a plurality of pumping capacitors which receive the internal power supply voltage, and may generate the plurality of voltages by selectively activating the plurality of pumping capacitors in response to the control of the control logic 114.

The plurality of generated voltages may be supplied to the memory cell array 113 by the address decoder 112.

The data read/write circuit 115 may include first to mth page buffers which are coupled to the memory cell array 113 through the first to mth bit lines BL[1:m], respectively. The first to mth page buffers operate in response to the control of the control logic 114.

The first to mth page buffers perform data communication with the data input/output circuit 116. In program, the first to mth page buffers receive data DATA to be stored, through the data input/output circuit 116.

In a program operation, the first to mth page buffers may transfer the data DATA to be stored, that is, the data DATA received through the data input/output circuit 116, to selected memory cells through bit lines BL, when a program pulse is applied to a selected word line. The memory cells of a selected page are programmed according to the transferred data DATA. A memory cell coupled with a bit line to which a program permission voltage (for example, a ground voltage) is applied may have an increased threshold voltage. The threshold voltage of a memory cell coupled with a bit line to which a program inhibition voltage (for example, a power supply voltage) is applied may be retained. In a program verify operation, the first to mth page buffers read page data through the bit lines BL from the selected memory cells.

In a read operation, the data read/write circuit 115 reads data DATA through bit lines BL from the memory cells of a selected page, and outputs the read data DATA to the data input/output circuit 116.

In an erase operation, the data read/write circuit 115 may float the bit lines BL. In an embodiment, the data read/write circuit 115 may include a column select circuit.

The data input/output circuit 116 is coupled to the first to m^th page buffers through data lines. The data input/output circuit 116 operates in response to the control of the control logic 114.

The data input/output circuit 116 may include a plurality of input/output buffers (not illustrated) which receive data to be inputted. In a program operation, the data input/output circuit 116 receives data DATA to be stored, from an external controller (not illustrated). In a read operation, the data input/output circuit 116 outputs data transferred from the first to mth page buffers included in the data read/write circuit 116, to the external controller.

The control logic 114 may be coupled to the address decoder 112, the voltage generator 111, the data read/write circuit 115 and the data input/output circuit 116. The control logic 114 may be configured to control general operations of the semiconductor memory device 110. The control logic 114 may operate in response to a command CMD transferred from an external device.

Figure 3:
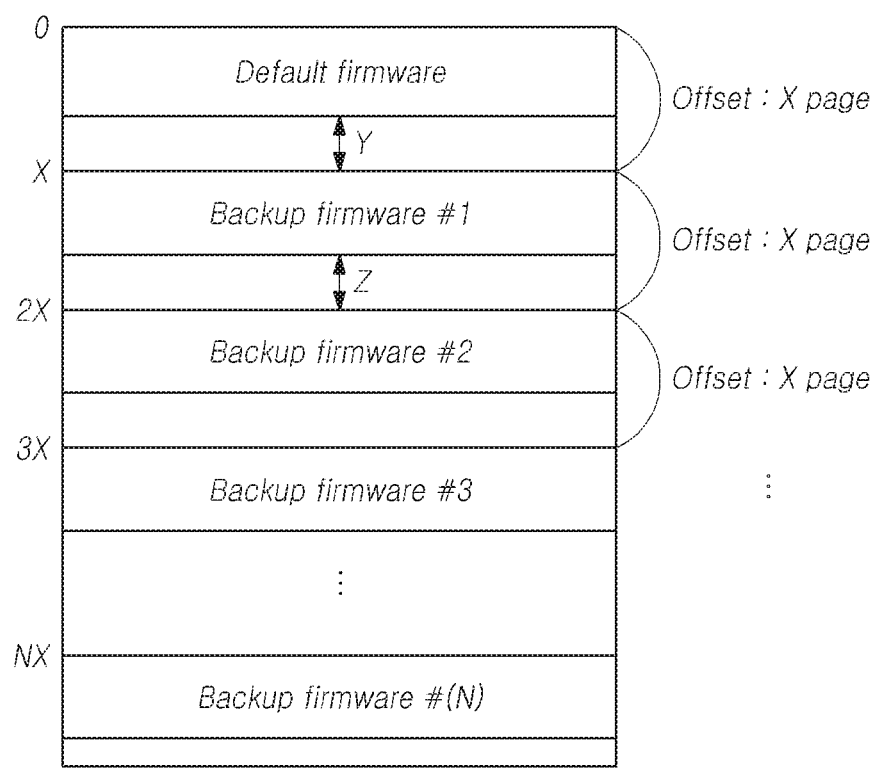
FIG. 3 is a diagram illustrating pieces of firmware stored in a first memory block of a semiconductor memory device, such as that of FIG. 1.

FIG. 3 is a diagram illustrating an example of plural pieces of the firmware stored in the first memory block of the semiconductor memory device 110 of FIG. 1.

Referring to FIG. 3, when initially storing the original firmware and multiple copies of the original firmware in the first memory block of the semiconductor memory device 110, both original firmware as the default firmware and plural copies of the original firmware as plural pieces of backup firmware may be stored in the first memory block.

In general, because the size (e.g., 1 MB) of firmware is smaller than the size of a memory block, the default firmware and the plural pieces of backup firmware may be stored in the same memory block, instead of being stored in different memory blocks.

The number of pieces of backup firmware stored in the first memory block may vary in different applications or system configurations. The number of pieces of backup firmware is not fixed, and may subsequently vary depending on the number of firmware updates.

The original firmware as the default firmware and the plural copies of the original firmware as the plural pieces of backup firmware may be stored in the first memory block in various methods.

For instance, default firmware may be stored in a region of which the start page index is T, where T is an integer of 0 or more. The start page index of a region where each backup firmware is stored may be obtained by adding a multiple of a first offset X (X is a natural number) to the start page index T of the region where the default firmware is stored.

The fact that the start page index of a region where a piece of firmware is stored is A means that the corresponding firmware is stored from a page of the index A. That is to say, the corresponding firmware is stored in pages A, A+1, A+2, . . . .

Therefore, if T=0 in the above-described example, the start page of the region where the default firmware is stored may be page 0 of the first memory block, and the default firmware may be stored from page 0 of the first memory block. Each piece of backup firmware may be stored from a page of which the index is a multiple of X.

If T=2 in the above-described example, the start page of the region where the default firmware is stored may be page 2 of the first memory block, and the default firmware may be stored from page 2 of the first memory block. Each backup firmware may be stored from a page of which the index is (2+I*X), where I is a natural number.

Referring to FIG. 3, the default firmware is stored from page 0 of the first memory block, and among pieces of backup firmware, backup firmware #1 is stored from a page X of the first memory block, backup firmware #2 is stored from a page 2X of the first memory block and backup firmware #3 is stored from a page 3X of the first memory block. In other words, the start page index of each backup firmware is a multiple of X, and the offset between the start page indexes of the pieces of backup firmware is X.

However, the sizes of last pages in which previous pieces of firmware are stored and start pages in which next pieces of firmware are stored may differ from one another. For example, in FIG. 3, the interval Y between a last page in which the default firmware is stored and a start page in which the backup firmware #1 is stored may be different from the interval Z between a last page in which the backup firmware #1 is stored and a start page in which the backup firmware #2 is stored. This occurs because the sizes between respective pieces of firmware are different from one another, although the interval between the start page indexes of regions where the respective pieces of firmware are stored is fixed.

The address of a last page in which a previous firmware is stored and the address of a start page in which a next firmware is stored may be adjacent to each other. For example, in FIG. 3, the default firmware may be stored in a region from the page 0 to a page X−1 of the first memory block, and the backup firmware #1 may be stored in a region of which the start page is the page X.

An example of a scheme for the firmware load circuit 125 of the controller 120 to select a piece of firmware to load is described below.

First, in the case where default firmware is valid, the firmware load circuit 125 may load the default firmware regardless of a state of backup firmware. Namely, the default firmware is selected with a highest priority.

As an example of a method for determining whether firmware is valid, the firmware load circuit 125 may inspect a checksum for the corresponding firmware or check whether a UECC (uncorrectable error correction code) or a page reading error occurs in the course of reading the firmware from the semiconductor memory device 110.

If a UECC (uncorrectable error correction code) or a page reading error by the host 50 occurs in the course of reading default firmware, the firmware load circuit 125 may determine that the default firmware is not valid. In this case, instead of loading the default firmware, the firmware load circuit 125 may load one of the pieces of backup firmware stored in the first memory block.

If a piece of backup firmware stored in a region of which the start page index is T+(I*X) is not valid, the firmware load circuit 125 may load another piece of backup firmware stored in a region of which the start page index is T+((I+1)*X) among the pieces of backup firmware. Here, each of T and I is 0 and X is a natural number.

For example, in FIG. 3, in the case where the default firmware is not valid, the firmware load circuit 125 loads the backup firmware #1 stored in the region of which the start page index is 0+((0+1)*X)=X with respect to the start page index 0 of the region where the default firmware is stored, based on the start page index of a region where each backup firmware is stored.

In the case where the backup firmware #1 is not valid as well, the firmware load circuit 125 loads the backup firmware #2 stored in the region of which the start page index is 0+((1+1)*X)=2X, based on the start page index X of the region where the backup firmware #1 is stored.

In the case where the backup firmware #2 is not valid as well, the firmware load circuit 125 loads the backup firmware #3 stored in the region of which the start page index is 0+((2+1)*X)=3X, based on the start page index 2X of the region where the backup firmware #2 is stored.

The firmware load circuit 125 may repeat the above process until valid firmware is identified.

Figure 4:
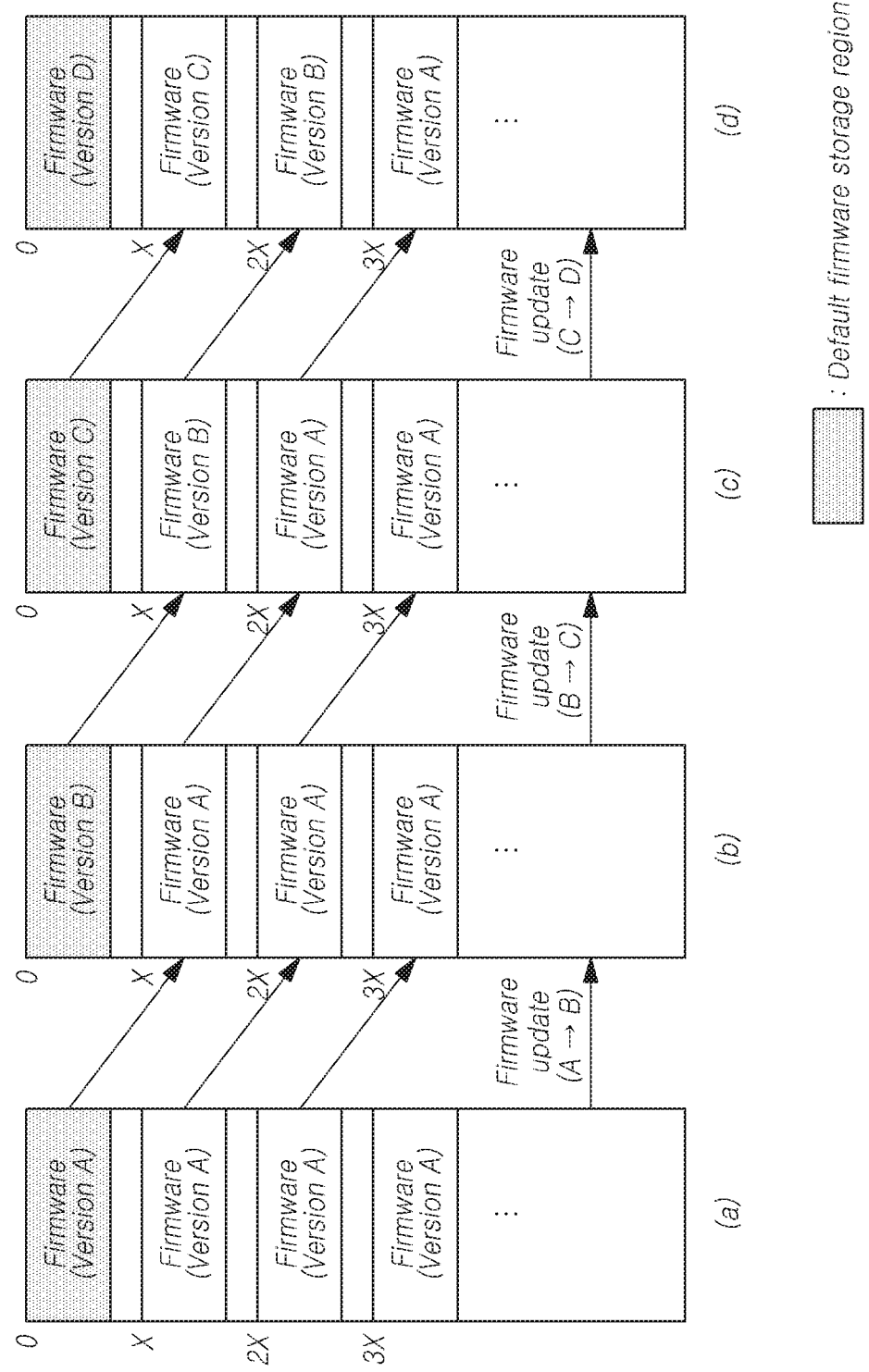
FIG. 4 is a diagram illustrating a process of updating original firmware to a version A, a version B, a version C and a version D, in accordance with an embodiment of the disclosure.

FIG. 4 is a diagram illustrating a process of updating the original firmware (version A) to a version B, to a version C and to a version D. This firmware update may be performed by the firmware update circuit 126 described above with reference to FIG. 1.

In FIG. 4, (a) illustrates a case where all of the versions of the original firmware initially stored in the first memory block are the same as A. That is to say, all of the versions of default firmware and pieces of backup firmware are initially the same as A.

The firmware update circuit 126 of the controller 120 may update the original firmware stored as the default firmware in the first memory block with the updated version B of the original firmware.

The firmware update circuit 126 may overwrite the updated version B of the original firmware to the region where the original firmware (i.e., the default firmware) is stored (the region of which the start page index is 0). In this disclosure, an operation of overwriting target data to a region means first erasing victim data already stored in that region and then storing the target data in that region. In accordance with an embodiment of the present invention, the operation of erasing data is performed on a memory block basis. Therefore, when the updated version of the original firmware is overwritten to the first memory block storing the original firmware, the first memory block is first erased and then the updated version of the original firmware is stored. A firmware update generally known in the art is performed in such a manner that updating firmware is stored in a region separate from that where existing firmware is stored and information indicating firmware to be driven upon booting is changed. However, in embodiments of the disclosure, since the updating firmware is overwritten to the region where the existing firmware is stored, the need to change information indicating firmware to be driven upon booting does not arise.

However, as described above, if the updated version B of the original firmware is overwritten to the region where the original firmware is stored, a problem may be caused in that the existing original firmware of the original version A is not secured. Therefore, in order to secure the existing original firmware, the existing original firmware of the original version A is overwritten to a region where a copy of the original firmware (i.e., a piece of backup firmware) most adjacent thereto is stored (the region of which the start page index is X) such that the existing original firmware may be secured. That is, the original firmware (version A) is stored right next to the region in which the updated version B of the original firmware is stored after the first memory block is erased. Then, the plural pieces of backup firmware (i.e., plural copies of the original firmware) are stored right next to the region in which the original firmware of the original version A is stored.

In FIG. 4, (b) illustrates a case where the default firmware is updated from version A to version B, which is an update of the original firmware. Referring to (b) of FIG. 4, the updated version B is overwritten to the region where the original firmware is stored in (a) of FIG. 4, and the existing original firmware of the original version A in (a) of FIG. 4 is stored in the region of the start page index X where the backup firmware has been stored.

In FIG. 4, (c) illustrates a case where the default firmware is updated from version B to the version C, which is another updated version of the original firmware. The updated version C is overwritten to the region (of which the start page index is 0) where version B is stored in (b) of FIG. 4, and the previously updated version B of the original firmware is overwritten to the region (of which the start page index is X) where the original firmware (version A) is stored in (b) of FIG. 4.

In FIG. 4, (d) illustrates a case where the default firmware is updated from the updated version C of the original firmware to an updated version D of the original firmware. The updated version D is overwritten to the region (of which the start page index is 0) where the updated version C is stored in (c) of FIG. 4, the previously updated version C of the original firmware is overwritten to the region (of which the start page index is X) where the previously updated version B of the original firmware is stored in (c) of FIG. 4, and the previously updated version B of the original firmware is overwritten to the region (of which the start page index is 2X) where the original firmware of the original version A is stored in (c) of FIG. 4.

Thus, generally, the firmware update circuit 126 may overwrite each firmware stored in a region of which the start page index is $T+(J*X)$ to a region of which the start page index is $T+((J+1)*X)$ (each of T and J is an integer of 0 or more).

By repeating the above-described process, among the various update versions of the original firmware stored in the first memory block, a most recently updated version of the original firmware is stored as the default firmware in the region of which the start page index is 0. The remaining update versions of the original firmware and the copies of the original firmware are stored as the plural pieces of backup firmware from the start page indexes X, 2X, 3X, . . . , respectively, in the order of updated time.

Therefore, if a most recently updated version of the original firmware, i.e., the default firmware is not valid, a previously updated version of the original firmware or a piece of backup firmware which is updated immediately before the most recently updated version of the original firmware may be loaded. Thus, it is possible to load valid firmware by searching pieces of firmware in the reverse order of an update history. In other words, in (d) of FIG. 4, the updated version D, the updated version C, the updated version B and the original firmware (version A) may be searched in that order, which is the reverse order of the update history.

Because the first memory block stores not only a latest updated version of the original firmware but also all updated versions of the original firmware, all of the firmware updates and the firmware update history may be checked through the first memory block.

If the default firmware is updated with an updated version of the original firmware and the updated version has an error due to a human error or the like or a problem occurs in a specific page of the first memory block, the storage device 100 may malfunction or enter a stuck state due to a failure to load the default firmware during a booting process. In addition, there may occur a case where a reversion to the original firmware of a specific updated version is required due to a problem in the storage device 100 or a problem in the host 50.

In this regard, if pieces of the firmware are stored in the manner described above with reference to FIG. 4, the storage device 100 may easily load valid firmware, and may be prevented from malfunctioning or entering a stuck state due to a failure to load firmware during a booting process.

On the other hand, in the case where the firmware load circuit 125 fails to load the default firmware (i.e., the original firmware or the most recently updated version of the original firmware) and loads one of the pieces of backup firmware (i.e., the previously updated versions of the original firmware and the copies of the original firmware), the firmware update circuit 126 may overwrite the loaded piece of backup firmware again to a region where the default firmware is stored or may download a newly updated version of the original firmware and update the default firmware in which an error has occurred, with the newly updated version of the original firmware.

The embodiments of FIGS. 3 and 4 are directed to a case where pieces of the firmware are stored in the first memory block of the semiconductor memory device 110. In connection with FIGS. 5 and 6, a case where a second memory block as a backup memory block for the first memory block exists is described.

While a firmware update for the original firmware stored in the first memory block is being performed, power supply to the storage device 100 may be interrupted and thus the firmware update may be terminated before it is completed. For example, if power supply is interrupted before writing an updated version of the original firmware to the first memory block after erasing that block to enable the update, and data or firmware is attempted to be read from the first memory block, the read attempt fails because there is no data or firmware in the first memory block.

In this case, in order to normally boot the storage device 100, it is necessary to revert back to the default firmware or firmware version stored in the first memory block before the most recent firmware update. To this end, the storage device 100 may use the second memory block as a backup memory block for the first memory block.

Figure 5:
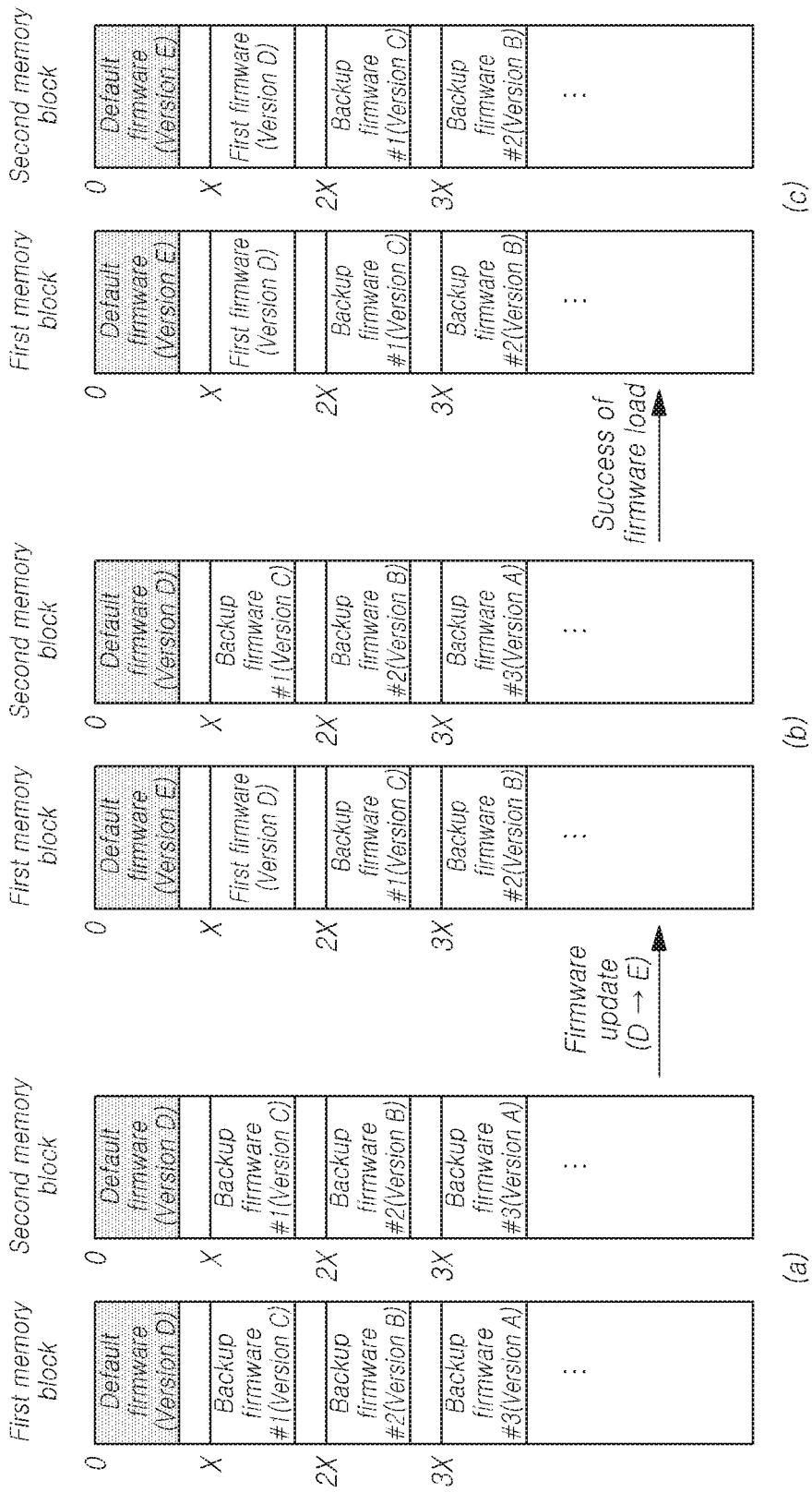
FIG. 5 is a diagram illustrating an operation in which at least one piece of firmware stored in the first memory block is loaded after a firmware update, in accordance with an embodiment of the disclosure.

FIG. 5 is a diagram illustrating an operation in the case where at least one of pieces of the firmware stored in the first memory block is loaded after a firmware update, in accordance with an embodiment of the disclosure.

In FIG. 5, (a) illustrates updated versions of the original firmware as the default firmware (i.e., an updated version D) and the plural pieces of backup firmware (i.e., updated versions C, B and A) as a piece of backup firmware which are stored in the first memory block and the second memory block, before a firmware update is performed to the default firmware from The updated version D of the original firmware to an updated version E of the original firmware. Observing (a) of FIG. 5, it may be seen that the updated versions of the original firmware stored in the first memory block and the second memory block are all the same.

If the default firmware is updated from the updated version D to the updated version E, the pieces of firmware stored in the first memory block are changed. Observing (b) of FIG. 5, in the case of the first memory block, the default firmware is updated to the updated version E as a result of the firmware update, whereas, in the case of the second memory block, the default firmware is not updated and still remains as the updated version D despite the firmware update.

The firmware stored in the second memory block is updated after the updated default firmware stored in the first memory block is successfully loaded. Namely, as a reset command is inputted from the host 50 or a power-off and a power-on occur after the firmware update is completed, if the updated version E is successfully loaded upon booting, the pieces of firmware stored in the first memory block are subsequently copied to the second memory block. That is to say, the time at which the firmware update is performed is different than the time at which the pieces of firmware stored in the first memory block are copied to the second memory block.

In FIG. 5, (c) illustrates the pieces of firmware which are stored in the first memory block and the second memory block after the copy is completed. Observing (c) of FIG. 5, it may be seen that the pieces of firmware stored in the first memory block are copied to the second memory block and the configurations of the first memory block and the second memory block are the same with each other.

Figure 6:
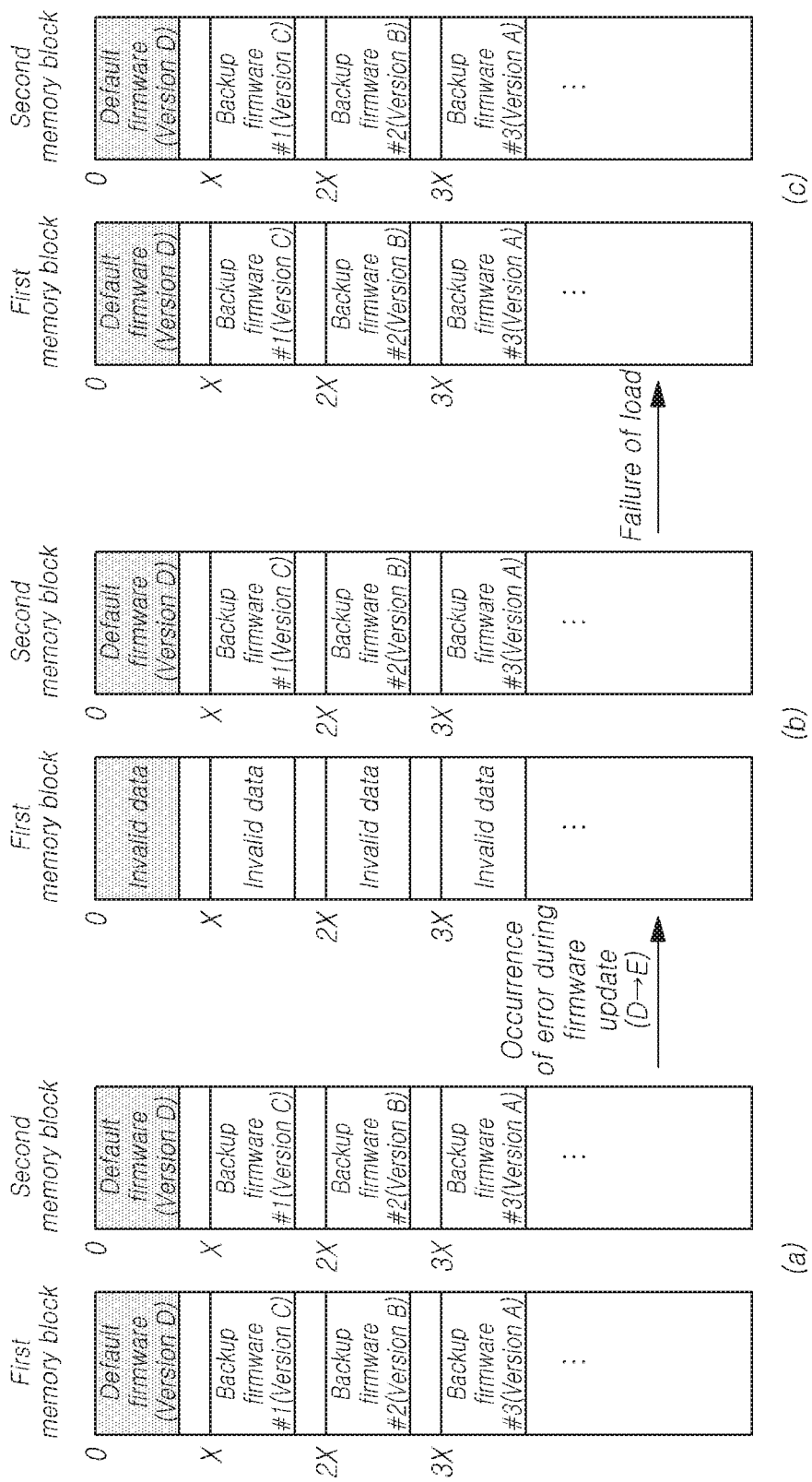
FIG. 6 is a diagram illustrating an operation in which loading of all pieces of firmware stored in the first memory block, after a firmware update, has failed, in accordance with an embodiment of the disclosure.

FIG. 6 is a diagram illustrating an operation in the case where loading of all pieces of firmware stored in the first memory block, after a firmware update, has failed, in accordance with an embodiment of the disclosure.

As described above, in the case where a firmware update is interrupted due to a sudden power-off (SPO) or the like, an error may occur in the pieces of firmware stored in the first memory block. In particular, in the case where the scheme of overwriting a currently updated version of the original firmware on a previously updated version of the original firmware at the time of firmware update as illustrated in FIGS. 3 and 4 is used, if the firmware update is interrupted while overwriting the pieces of firmware stored in the first memory block, it may subsequently fail to load all the pieces of firmware stored in the first memory block.

In this case, one of the pieces of firmware stored in the second memory block may be loaded, and, if the loading of the firmware succeeds, by subsequently copying the pieces of firmware stored in the second memory block to the first memory block, the first memory block may be reverted back to a state before the firmware update.

In FIG. 6, (*a*) illustrates pieces of firmware which are stored in the first memory block and the second memory block before the firmware update is performed. Observing (a) of FIG. 6, it may be seen that the configurations of the pieces of firmware stored in the first memory block and the configurations of the pieces of firmware stored in the second memory block are all the same with each other.

In FIG. 6, (*b*) illustrates pieces of firmware which are stored in the first memory block and the second memory block, when an SPO occurs during the firmware update of the default firmware from the updated version D to the updated version E. Due to the power-off, an error (e.g., detection of a UECC or erased data) may occur in all the pieces of firmware stored in the first memory block, and thus, it is impossible to load the pieces of firmware stored in the first memory block.

In this case, the firmware load circuit 125 may load the default firmware stored in the second memory block instead of the pieces of firmware stored in the first memory block. A scheme of selecting firmware to be loaded in the second memory block may be the same as the scheme of selecting firmware to be loaded in the first memory block.

In FIG. 6, (*c*) illustrates the pieces of firmware stored in the first memory block and the second memory block when the pieces of firmware stored in the second memory block are copied to the first memory block after firmware stored in the second memory block is successfully loaded. Observing (c) of FIG. 6, it may be seen that the first memory block is reverted back to the same state as illustrated in (a) of FIG. 6.

Thus, in the embodiments of FIGS. 5 and 6, the second memory block may be configured as a mirror block of the first memory block.

FIGS. 3 to 6 were described in the context in which a selected firmware is loaded based on a state in which pieces of firmware are stored in the first memory block. However, a particular version of the original firmware which is specifically indicated from an external source among the default firmware and the backup firmware in the first memory block may be loaded.

For instance, the host 50 may explicitly indicate a specific version of the original firmware among the various versions of the original firmware stored in the first memory block for a particular use (e.g., a debugging or a recovery) such that booting is performed through the indicated firmware.

Figure 7:
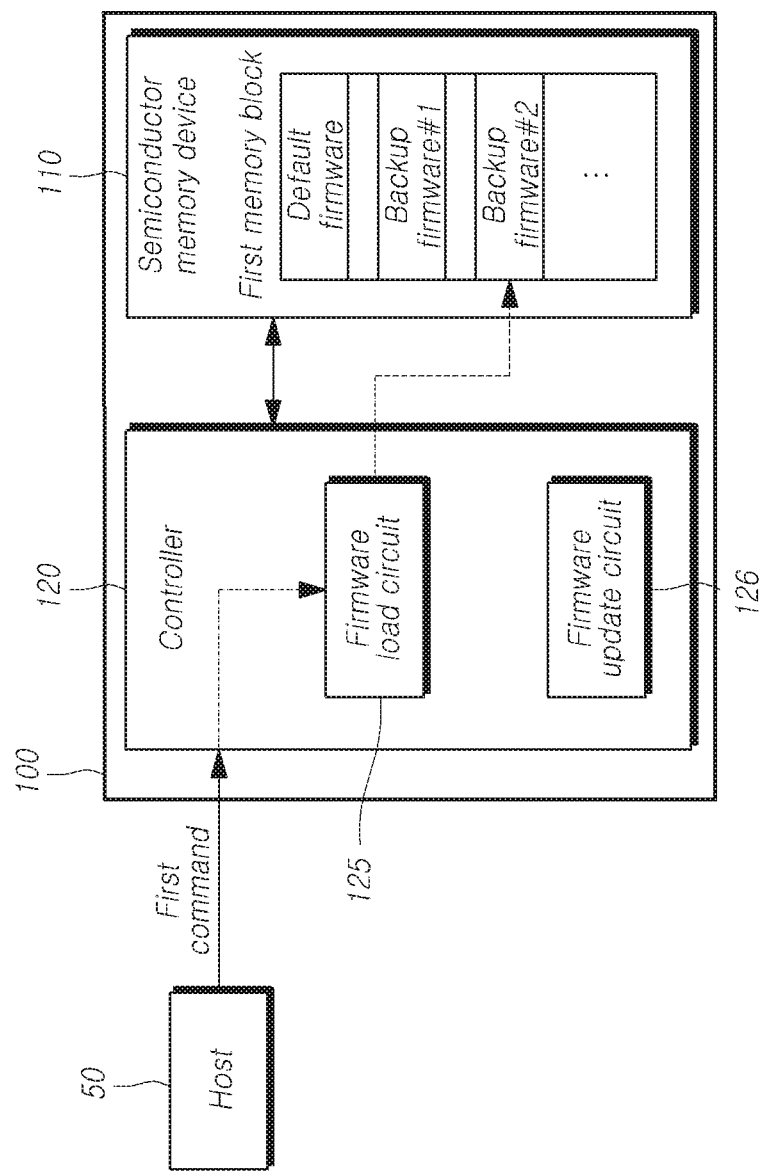
FIG. 7 is a diagram illustrating an operation of selecting firmware to load, based on a first command transmitted from a host, in accordance with an embodiment of the disclosure.

FIG. 7 is a diagram illustrating an operation of selecting firmware to load, based on a first command transmitted from the host 50, in accordance with an embodiment of the disclosure.

Referring to FIG. 7, the host 50 may transmit a first command, which indicates firmware to load, to the controller 120.

When the controller 120 receives the first command from the host 50, the firmware load circuit 125 of the controller 120 may load the firmware indicated by the first command in the first memory block. The firmware load circuit 125 may directly receive the first command from the host 50 or may receive the first command through the host interface 121.

The firmware indicated by the first command may be one of the pieces of backup firmware stored in the first memory block. For example, the first command may command that booting be performed using the backup firmware #2 among the pieces of backup firmware.

For instance, the backup firmware indicated by the first command may be firmware dedicated for debugging or firmware dedicated for recovery. That is to say, in order to allow the host 50 to perform a debugging operation or a recovery operation, the firmware load circuit 125 may select a piece of backup firmware dedicated for debugging or r recovery among the pieces of backup firmware, and may load a selected piece of backup firmware.

For another instance, in the case where firmware updates are performed N times, the piece of backup firmware indicated by the first command may be one of the first to (N−1)th updated pieces of backup firmware. The firmware load circuit 125 may load a piece of backup firmware of a specific version among previously used pieces of backup firmware.

FIGS. 3 to 7 were described in the context of the first memory block storing firmware to be used upon booting. However, any of the plurality of memory blocks may be selected and used for that purpose.

Figure 8:
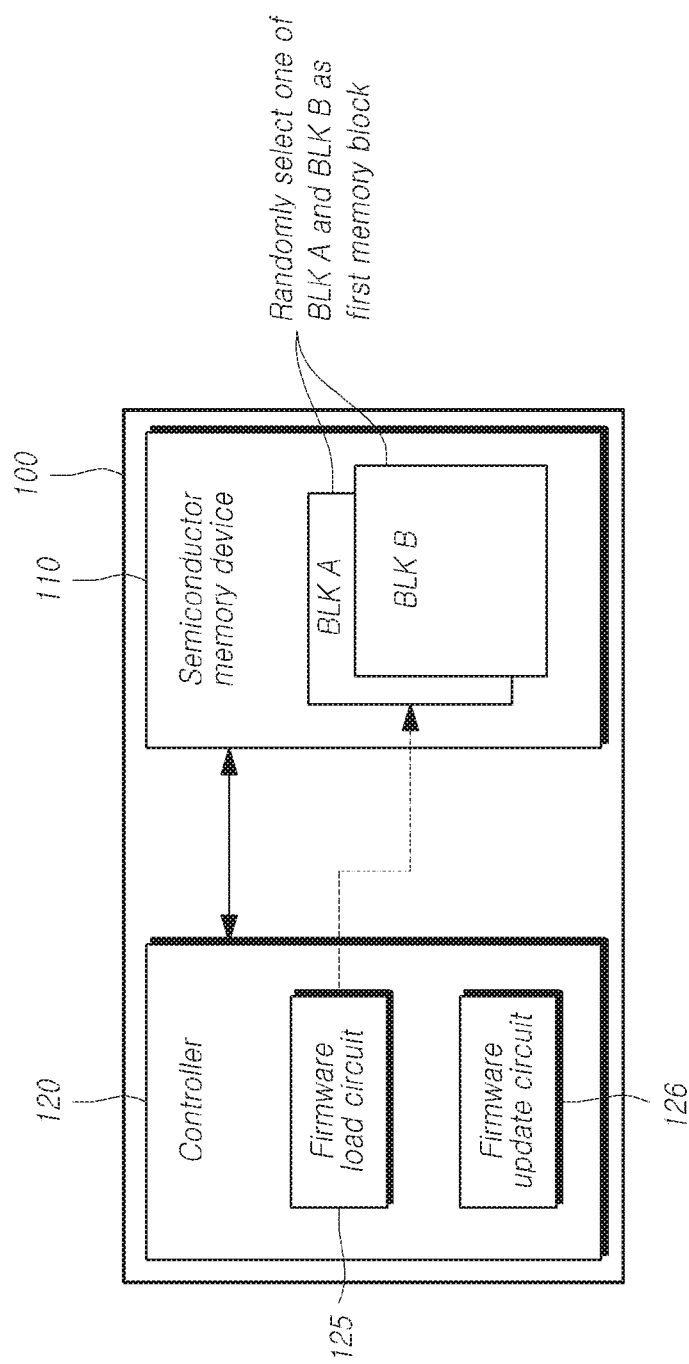
FIG. 8 is a diagram illustrating an operation of randomly selecting a first memory block, in accordance with an embodiment of the disclosure.

FIG. 8 is a diagram illustrating an operation of randomly selecting a first memory block, in accordance with an embodiment of the disclosure.

Referring to FIG. 8, the firmware load circuit 125 may randomly select one of two memory blocks BLK A and BLK B predetermined among a plurality of memory blocks in the semiconductor memory device 110, as the first memory block, upon booting.

In this way, by randomly selecting the first memory block upon each booting, an access load is dispersed among all of the memory blocks. Thus, it is possible to prevent a problem that the frequency of accessing a specific memory block abruptly increases and thus the corresponding memory block quickly breaks down.

Seed information used to randomly select the first memory block may be, for example, a tick value of a system or a time information measured as an RTC (real time clock).

Figure 9:
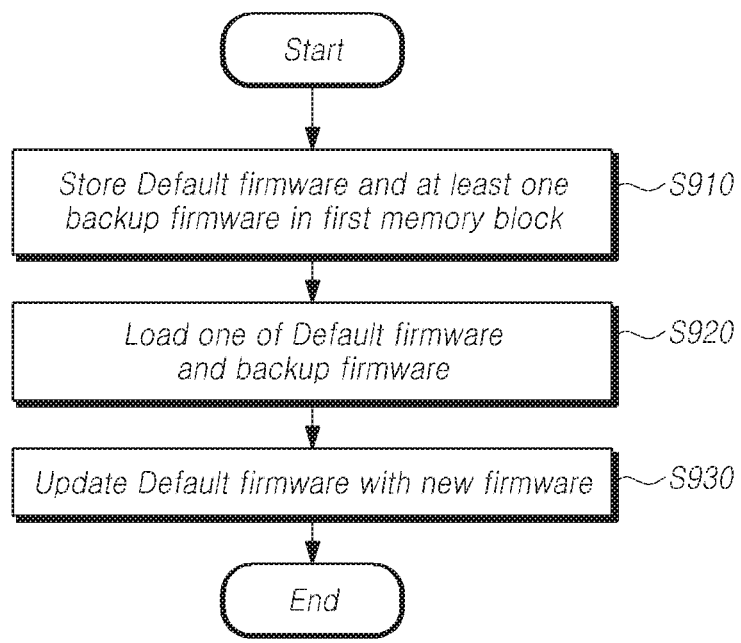
FIG. 9 is a flow chart illustrating an operation of a storage device in accordance with an embodiment of the disclosure.

FIG. 9 is a flow chart illustrating an operation of a storage device in accordance with an embodiment of the disclosure. The operation may be performed by the storage device described above.

Referring to FIG. 9, the semiconductor memory device 110 of the storage device 100 may include therein a plurality of memory blocks, and may store default firmware and one or more pieces of backup firmware in a first memory block among the plurality of memory blocks (S910). Initially, the original firmware may be the default firmware and the copies of the original firmware may be the pieces of backup firmware, as describe with reference to FIG. 4 (*a*).

The firmware load circuit 125 included in the controller 120 of the storage device 100 may load one of the default firmware and the pieces of backup firmware stored in the first memory block (S920).

In this regard, the firmware load circuit 125 may load the load the default firmware if the default firmware is valid, and may load one of the pieces of backup firmware if the default firmware is not valid. As described above with reference to FIG. 3, the start page index of a region where each backup firmware is stored may be obtained by adding a multiple of a first offset X to a start page index T of a region where the default firmware is stored, where T is an integer of 0 or more and X is a natural number. And the firmware update circuit 126 may update the default firmware with an updated version of the original firmware (S930).

A method for the firmware load circuit 125 to select firmware to be loaded among the default firmware and the pieces of backup firmware stored in the first memory block is described in detail with reference to FIG. 10.

Figure 10:
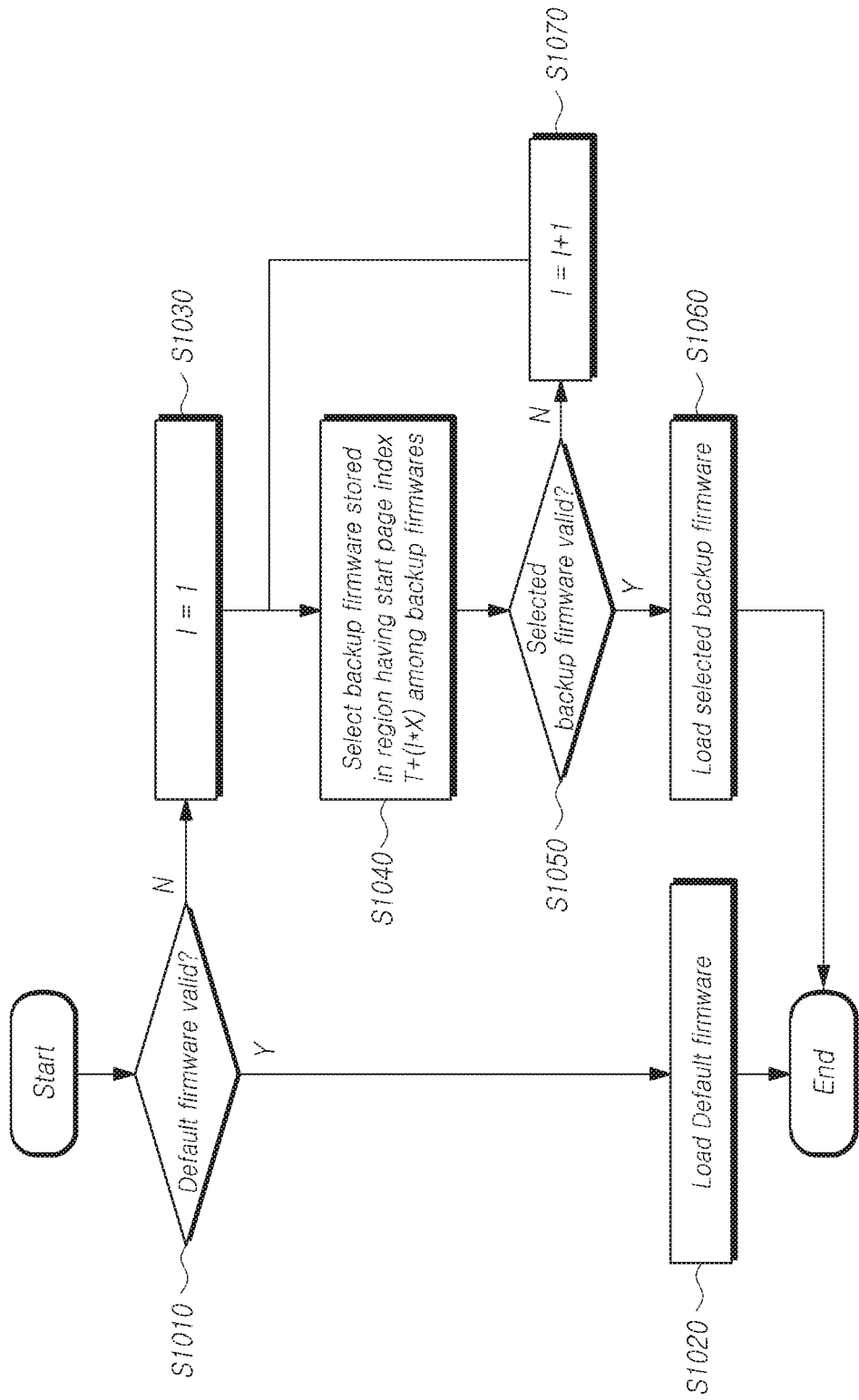
FIG. 10 is a flow chart illustrating an operation of determining pieces of firmware to be loaded among all pieces of firmware stored in a first memory block, in accordance with an embodiment of the disclosure.

FIG. 10 is a flow chart illustrating an operation of determining firmware to be loaded among pieces of firmware stored in a first memory block, in accordance with an embodiment of the disclosure. The operation may be performed by the firmware load circuit 125 previously described.

Referring to FIG. 10, the firmware load circuit 125 determines whether the default firmware among the pieces of firmware stored in the first memory block of the semiconductor memory device 110 is valid (S1010).

As previously explained, whether the firmware is valid, may be determined by inspecting a checksum of the firmware or checking whether a UECC or a page reading error has occurred.

It is assumed that the default firmware is stored in a region of the first memory block of which the start page index is T, where T is an integer of 0 or more. For example, in FIG. 3, T=0, and the default firmware is stored in a region of which the start page index is 0.

In the case where the default firmware is valid (S1010-Y), the firmware load circuit 125 immediately loads the default firmware regardless of whether backup firmware is valid or not (S1020).

Conversely, in the case where the default firmware is not valid (S1010-N), the firmware load circuit 125 selects firmware to be loaded among the pieces of backup firmware. In this regard, I=1 is set initially (S1030), and the firmware load circuit 125 selects a piece of backup firmware stored in a region of which the start page index is T+(I*X) among the pieces of backup firmware (S1040).

For example, in the case of FIG. 3, if I=1, since the piece of backup firmware stored in the region of which the start page index is T+(I*X)=X is the backup firmware #1, the firmware load circuit 125 selects the backup firmware #1.

The firmware load circuit 125 determines whether the selected piece of the backup firmware is valid (S1050). In the case where the selected piece of backup firmware is valid (S1050-Y), the firmware load circuit 125 loads the selected piece of backup firmware (S1060).

Conversely, in the case where the selected piece of backup firmware is not valid (S1050-N), the value of I is increased by 1 (S1070), and step S1040 is repeated. For example, in the case of FIG. 3, if the backup firmware #1 is not valid as well, I=1+1=2, the backup firmware #2 stored in a region of which the start page index is T+(I*X)=2X is selected. If the backup firmware #2 is not valid as well, 1=2+1=3, the backup firmware #3 stored in a region of which the start page index is T+(I*X)=3X is selected.

Figure 11:
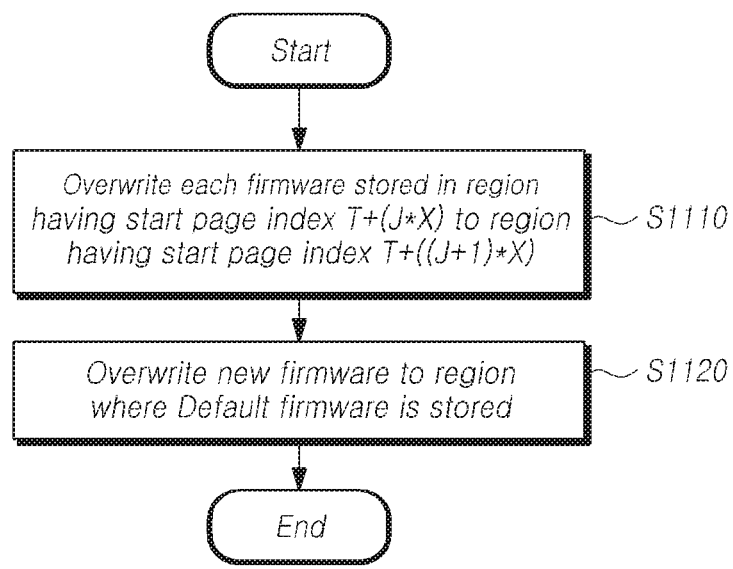
FIG. 11 is a flow chart illustrating an operation of updating pieces of firmware in accordance with an embodiment of the disclosure.

FIG. 11 is a flow chart illustrating an operation of updating the original firmware in accordance with an embodiment of the disclosure. The operation may be performed by the firmware update circuit 126 previously described.

Referring to FIG. 11, the firmware update circuit 126 overwrites each piece of firmware stored in a region of which the start page index is T+(J*X) to a region of which the start page index is T+((J+1)*X), where each of T and 3 is an integer of 0 or more and X is a natural number (S1110).

For example, referring to (a) and (b) of FIG. 4, the original firmware (version A) stored in the region of which the start page index is 0 is overwritten to the region of which the start page index is 0+((0+1)*X)=X.

For another example, referring to (c) and (d) of FIG. 4, the updated version C of the original firmware stored in the region of which the start page index is 0 is overwritten to the region (of which the start page index is X) where the updated version B of the original firmware is stored, and the updated version B of the original firmware stored in the region of which the start page index is X is overwritten to the region (of which the start page index is 2X) where the original firmware (version A) is stored.

Further, the firmware update circuit 126 may overwrite a currently updated version of the original firmware to a region where default firmware is stored (S1120).

For example, referring to (a) and (b) of FIG. 4, the updated version B of the original firmware is overwritten to the region (of which the start page index is 0) where the default firmware is stored.

Figure 12:
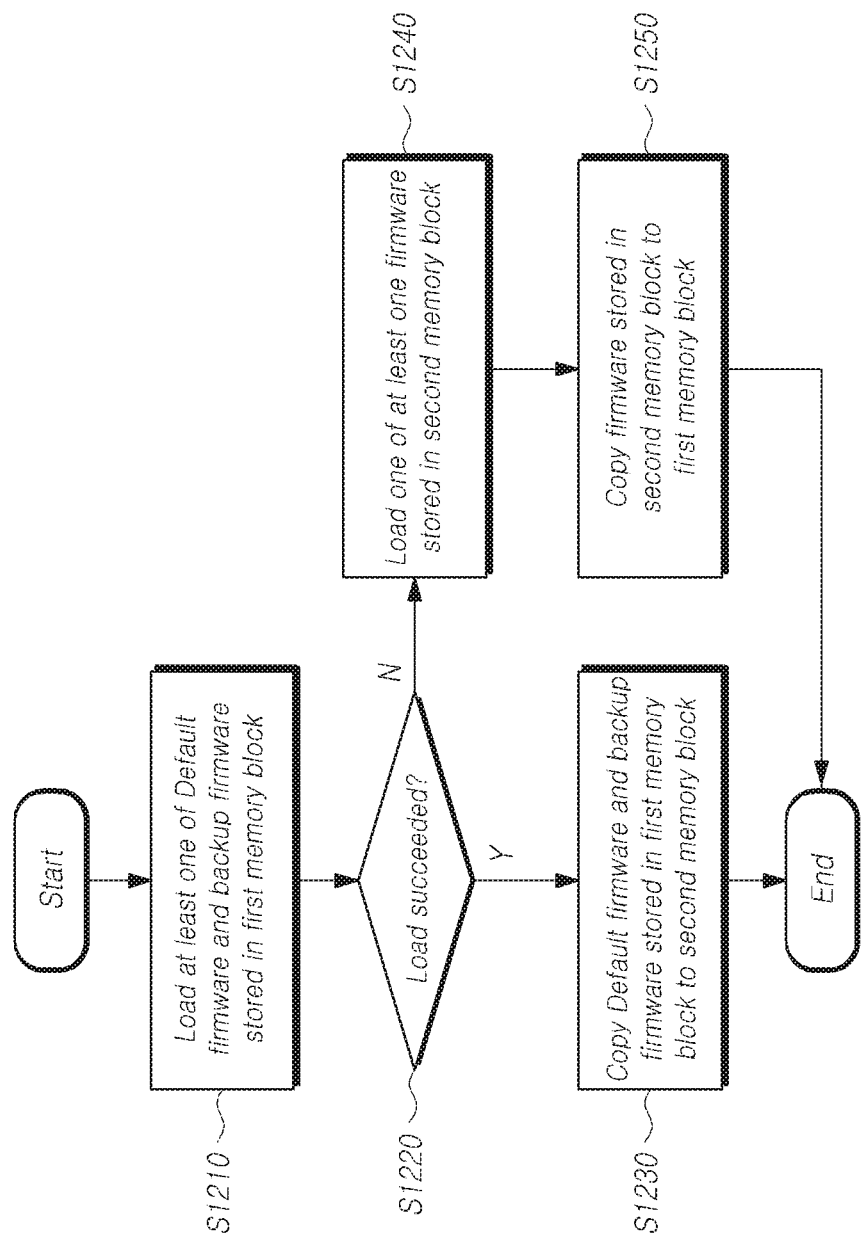
FIG. 12 is a flow chart illustrating an operation of copying stored pieces of firmware from one memory block to another memory block depending on whether loading of firmware succeeds or not, in accordance with an embodiment of the disclosure.

FIG. 12 is a flow chart illustrating an operation of copying stored pieces of firmware between a first memory block and a second memory block depending on whether loading of firmware succeeds or not, in accordance with an embodiment of the disclosure. The operation may be performed by the firmware load circuit 125 previously described.

Referring to FIG. 12, the firmware load circuit 125 loads one of default firmware and backup firmware stored in the first memory block (S1210). As a method for selecting firmware to load, the method described above with reference to FIG. 10 may be used.

Thereafter, the firmware load circuit 125 determines whether the loading of the firmware has succeeded (S1220). In the case where the loading of the firmware has succeeded (S1220-Y), in order to back up the default firmware and the backup firmware stored in the first memory block, the firmware load circuit 125 may copy the default firmware and the backup firmware stored in the first memory block to a second memory block (S1230).

Conversely, in the case where the loading of the firmware has failed (S1220-N), which means that the default firmware and the backup firmware stored in the first memory block have an error therein, the firmware load circuit 125 may load one among the default firmware and the backup firmware stored in the second memory block, as a backup memory block, and then, may revert the first memory block back to a previous state.

In detail, the firmware load circuit 125 may load one of the default firmware and the backup firmware stored in the second memory block, as a backup memory block, upon booting (S1240). As a method for selecting firmware to load, the method described above with reference to FIG. 10 may be used.

Thereafter, if the selected firmware stored in the second memory block is loaded, in order to revert back the first memory block, the firmware load circuit 125 may copy the default firmware and the backup firmware stored in the second memory block to the first memory block (S1250).

Figure 13:
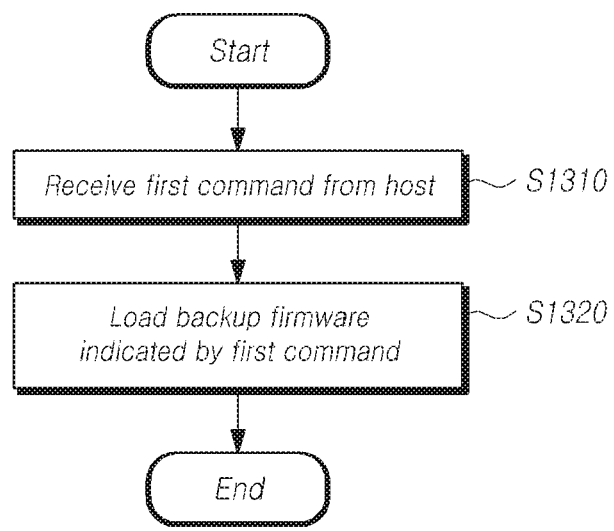
FIG. 13 is a flow chart illustrating an operation of loading firmware based on a command received from a host, in accordance with an embodiment of the disclosure.

FIG. 13 is a flow chart illustrating an operation of loading firmware based on a command received from a host, in accordance with an embodiment of the disclosure. The operation may be performed by the controller 120 previously described.

First, the controller 120 of the storage device 100 receives a first command from the host 50 (S1310). The first command includes information specifically indicating backup firmware as a target to load among the pieces of backup firmware stored in the first memory block of the semiconductor memory device 110 of the storage device 100.

Thereafter, the firmware load circuit 125 in the controller 120 of the storage device 100 loads the backup firmware indicated by the first command (S1320). As described above with reference to FIG. 7, the backup firmware indicated by the first command may be firmware dedicated for debugging or firmware dedicated for recovery.

Figure 14:
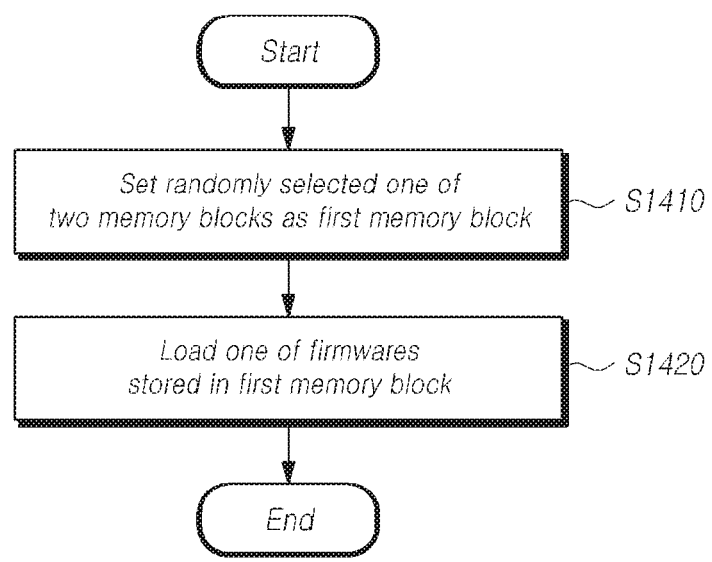
FIG. 14 is a flow chart illustrating an operation of selecting a first memory block among a plurality of memory blocks in accordance with an embodiment of the disclosure.

FIG. 14 is a flow chart illustrating an operation of selecting a first memory block among a plurality of memory blocks in accordance with an embodiment of the disclosure. The operation may be performed by the firmware load circuit 125 previously described.

First, the firmware load circuit 125 randomly selects one among two memory blocks among a plurality of memory blocks in the semiconductor memory device 110, as a first memory block (S1410). The two memory blocks from which one is selected may be predetermined. As described above with reference to FIG. 8, seed information used to randomly select the first memory block may be, for example, a tick value of a system or a time information measured as an RTC (real time clock).

The firmware load circuit 125 may load default firmware or a piece of backup firmware which are stored in the selected first memory block (S1420). (For example, the default firmware or a piece of backup firmware can be stored by an external device (tool) in the manufacturing process of the storage device.) As a method for selecting firmware to load, the method described above with reference to FIG. 10 may be used.

It will be understood by those skilled in the art that technical configurations described above can be modified or embodied in other arrangements without departing from the spirit and essential characteristics of the disclosure. Therefore, it should be understood that the embodiments described above are illustrative and not restrictive. The scope of the invention is defined by the appended claims rather than the foregoing description, and all changes or modifications that fall within the scope of the claims and their equivalents are encompassed by the invention.

In the above described embodiments of the disclosure, some steps may be selectively performed or omitted. Moreover, the steps do not necessarily need to be performed in the sequential order as depicted, and they may be performed in a changed order.

Those skilled in the art will understand from the disclosure that various modifications and changes can be made thereto without departing from the broader spirit and scope of the disclosure. Thus, the present invention encompasses not only the disclosed embodiments but all changes and modifications that fall within the scope of the claims and their equivalents.

What is claimed is:

1. A storage device comprising:
a semiconductor memory device including a plurality of memory blocks; and
a controller configured to control the semiconductor memory device,
wherein the semiconductor memory device stores original firmware as default firmware and one or more copies of the original firmware as pieces of backup firmware in a first memory block among the plurality of memory blocks, and
wherein the controller comprises:
a firmware load circuit configured to load the default firmware when the default firmware is valid and load one of the pieces of backup firmware sequentially according to a start page index of a region corresponding to multiple offsets where each piece of backup firmware is stored when the default firmware is not valid; and
a firmware update circuit configured to update the original firmware with an updated version of the original firmware, a currently updated version becoming the default firmware and the original firmware becoming one of the pieces of backup firmware.

2. The storage device according to claim 1,
wherein a start page index of a region where each piece of backup firmware is stored is obtained by adding a multiple of a first offset X to a start page index T of a region where the default firmware is stored, and
wherein T is an integer of 0 or more and X is a natural number.

3. The storage device according to claim 2,
wherein, when a piece of backup firmware stored in a region of which a start page index is T+(I*X) is not valid, the firmware load circuit loads another piece of backup firmware stored in a region of which a start page index is T+((I+1)*X), and
wherein I is an integer of 0 or more.

4. The storage device according to claim 2,
wherein the firmware update circuit overwrites firmware stored in a region of which a start page index is T+(J*X) to a region of which a start page index is T+((J+1)*X), and overwrites the currently updated version of the original firmware to the region where the default firmware is stored, and
wherein J is an integer of 0 or more.

5. The storage device according to claim 4, wherein, when loading of the default firmware or a piece of backup firmware stored in the first memory block succeeds, the firmware load circuit copies the default firmware and the pieces of backup firmware stored in the first memory block to a second memory block of the semiconductor memory device.

6. The storage device according to claim 5, wherein, when loading of the default firmware or the piece of the backup firmware stored in the first memory block fails, the firmware load circuit loads a piece of the firmware stored in the second memory block, and copies the pieces of the firmware stored in the second memory block to the first memory block.

7. The storage device according to claim 1, wherein, in the case where a first command is received from a host, the firmware load circuit loads a piece of the backup firmware which is indicated by the first command among the pieces of the backup firmware.

8. The storage device according to claim 7, wherein the backup firmware indicated by the first command is dedicated for debugging or recovery.

9. The storage device according to claim 1, wherein the first memory block is randomly selected from two memory blocks predetermined among the plurality of memory blocks.

10. A method for operating a storage device including a semiconductor memory device which includes a plurality of memory blocks and a controller which controls the semiconductor memory device, the method comprising:
storing original firmware as default firmware and one or more copies of the original firmware as pieces of backup firmware in a first memory block in the semiconductor memory device;
loading the default firmware or one of the pieces of backup firmware; and
updating the original firmware with an updated version of the original firmware, a currently updated version becoming the default firmware and the original firmware becoming one of the pieces of backup firmware,
wherein the loading of the default firmware or one of the pieces of backup firmware includes loading the default firmware when the default firmware is valid and loading the piece of backup firmware sequentially according to a start page index of a region corresponding to multiple offsets where each piece of backup firmware is stored when the default firmware is not valid.

11. The method according to claim 10,
wherein a start page index of a region where each piece of backup firmware is stored is obtained by adding a multiple of a first offset X to a start page index T of a region where the default firmware is stored, and
wherein T is an integer of 0 or more and X is a natural number.

12. The method according to claim 11,
wherein, when the piece of backup firmware stored in a region of which a start page index is T+(I*X) is not valid, the loading of the default firmware or one of the pieces of the backup firmware includes loading another piece of backup firmware stored in a region of which a start page index is T+((I+1)*X), and
wherein I is an integer of 0 or more.

13. The method according to claim 11,
wherein each firmware stored in a region of which a start page index is T+(J*X) is overwritten to a region of which a start page index is T+((J+1)*X),
wherein the currently updated version of the original firmware is overwritten to the region where the default firmware is stored, and
wherein J is an integer of 0 or more.

14. The method according to claim 13, wherein, when the loading succeeds, the loading further includes copying the default firmware and the pieces of the backup firmware stored in the first memory block to a second memory block of the semiconductor memory device.

15. The method according to claim 14, wherein, when the loading succeeds, the loading further includes loading one of one or more pieces of firmware stored in the second memory block, and copying the pieces of the firmware stored in the second memory block to the first memory block.

16. The method according to claim 10, further comprising: loading, in the case where a first command is received from a host, a piece of backup firmware which is indicated by the first command among the pieces of backup firmware.

17. The method according to claim 16, wherein the backup firmware indicated by the first command is dedicated for debugging or recovery.

18. The method according to claim 10, wherein the first memory block is randomly selected from two memory blocks predetermined among the plurality of memory blocks.

19. A storage device comprising:
 a memory device including:
  a first memory block configured to sequentially store original firmware as default firmware and plural copies of the original firmware as pieces of the backup firmware in a plurality of storage regions in the first memory block; and
  a second memory block configured as a mirror block of the first memory block; and
 a controller configured to control the memory device to:
  update the firmware stored in the first memory block such that a currently updated version of the original firmware, one or more previously updated versions of the original firmware, the original firmware and one or more copies of the original firmware are stored sequentially into the storage regions, the currently updated version becoming the default firmware and the other pieces of firmware becoming the pieces of the backup firmware;
  sequentially load to the controller the default firmware and the backup firmware from the first and second memory blocks when any piece of the firmware currently to be loaded is determined as invalid;
  copy the firmware stored in the first memory block to the second memory block, when any piece of the firmware determined as valid is loaded from the first memory block; and
  copy the firmware stored in the second memory block to the first memory block, when any piece of the firmware determined as valid is loaded from the second memory block.

\* \* \* \* \*